United States Patent
Kim et al.

(10) Patent No.: US 8,886,749 B2
(45) Date of Patent: Nov. 11, 2014

(54) METHOD AND APPARATUS FOR CONTROLLING DATA USAGE OF MOBILE TERMINAL

(75) Inventors: Kwan Su Kim, Suwon-si (KR); Jeong Hyo Yi, Suwon-si (KR); Hyun Woo Lee, Gyeongsan-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 13/227,331

(22) Filed: Sep. 7, 2011

(65) Prior Publication Data

US 2012/0059905 A1 Mar. 8, 2012

(30) Foreign Application Priority Data

Sep. 7, 2010 (KR) .................. 10-2010-0087390

(51) Int. Cl.
*G06F 15/16* (2006.01)
*G06F 17/30* (2006.01)
(52) U.S. Cl.
CPC .............. *G06F 17/30899* (2013.01)
USPC ......................................... 709/217

(58) Field of Classification Search
USPC ........................................ 709/217
See application file for complete search history.

(56) References Cited

U.S. PATENT DOCUMENTS 5,987,480 A * 11/1999 Donohue et al. ............. 715/207
2012/0047199 A1 * 2/2012 Patrawala et al. ............ 709/203

OTHER PUBLICATIONS

Dr. Antony Selvdoss Davamani (A survey on processing methods for web usage data, Apr. 8, 2010.*

* cited by examiner

*Primary Examiner* — Yves Dalencourt

(57) ABSTRACT

A method and an apparatus for controlling data usage of a mobile terminal. The method includes checking a plurality of web contents contained in a web page in a web browser executing mode. The method also includes selectively downloading at least one of the checked web contents when data usage for a preset period exceeds a data usage limit. The method further includes displaying the at least one downloaded web content. The apparatus performs the method. Without periodic control of data usage by a user, the data usage of a mobile terminal is automatically controlled.

21 Claims, 4 Drawing Sheets

METHOD AND APPARATUS FOR CONTROLLING DATA USAGE OF MOBILE TERMINAL

CROSS-REFERENCE TO RELATED APPLICATION(S) AND CLAIM OF PRIORITY

The present application is related to and claims the benefit under 35 U.S.C. §119 a of a Korean patent application filed in the Korean Intellectual Property Office on Sep. 7, 2010 and assigned Serial No. 10-2010-0087390, and the entire disclosure of which is hereby incorporated by reference.

TECHNICAL FIELD OF THE INVENTION

The present invention relates generally to a method and an apparatus for establishing communication of a mobile terminal with a web server, and more particularly, to a method and an apparatus for controlling data usage of a mobile terminal downloaded from a web server.

BACKGROUND OF THE INVENTION

With continued development of devices which are installed in a mobile terminal and software for driving the same, portable convenience for mobile terminals is improved and various programs may be used in the mobile terminal. For example, in addition to processing a voice call while moving, the mobile terminal may access a web server for web browsing.

In order to communicate with a web server, an existing mobile terminal accesses a communication network. A communication network provider may charge a user of the mobile terminal for the service for allowing the mobile terminal to access the web server. When the mobile terminal uses a communication network provided by a mobile communication company, the mobile terminal may download up to preset data usage per billing cycle under a registered data plan. However, if the mobile terminal downloads data excessive of the preset data usage, a user may pay an extra charge for the additionally downloaded data to the mobile communication company.

Thus, for web browsing using an existing mobile terminal, a user may feel inconvenienced in directly controlling data usage. In other words, a user may need to check periodically whether the data usage of the mobile terminal exceeds the preset data usage during the web browsing. When the current data usage of the mobile terminal is close to the preset data usage, a user may stop or control the web browsing.

Thus, a proposal method of controlling data usage of a mobile terminal over the preset data usage is needed.

SUMMARY OF THE INVENTION

To address the above-discussed deficiencies of the prior art, it is a primary object to provide a method and an apparatus for automatically controlling data usage of a web browser while a mobile terminal performs web browsing.

In accordance with the aspects of the present invention, a method of controlling data usage by a mobile terminal is provided. The method includes checking a plurality of web contents contained in a web page in a web browser executing mode. The method also includes selectively downloading at least one of the checked web contents when data usage for a preset period exceeds a data usage limit. The method further includes displaying the at least one downloaded web content.

The present invention also provides a mobile terminal. The mobile terminal includes a storage configured to store a web browser, data usage of the web browser for a preset period, and a data usage limit. The mobile terminal also includes a web browser controller configured to check a plurality of web contents contained in a web page in a web browser executing mode and selectively download one of the checked web contents when the data usage exceeds the data usage limit. The mobile terminal further includes a display unit configured to display the at least one downloaded web content.

According to the method and the apparatus of the present invention, the data usage of the mobile terminal is automatically controlled without periodic controlling of the data usage by a user.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication network. Detailed descriptions of well-known functions and structures incorporated herein may be omitted to avoid obscuring the subject matter of the present invention.

In the following description, the term 'web page' means a screen displayed on a web browser. The web page is displayed when a file written with HyperText Markup Language (HTML) or other Markup Language (hereinafter, refer to as an "HTML file") is interpreted by the web browser. The HTML file may include HTML tags, text, and/or links. The term 'web content' means the content that forms the web page. For example, the web content may be text, an image, a moving picture, a flash, sound data, streaming media, and the like. The web page includes at least one web content.

The term 'web server' means a server that has a single web address and provides an HTML file and web content of a web page. The term 'web browser' means an application program that makes a request for the web server to transmit the HTML file of the web page based on the input web address and interprets the downloaded HTML file to display the web page. The term 'data usage' of the web browser means a size of information downloaded from the web server through the connection with the web server. The term 'web browser executing mode' means a state in which the web browser makes a request for the HTML file of the web page to the web server and downloads the requested HTML file from the web server.

Figure 1:
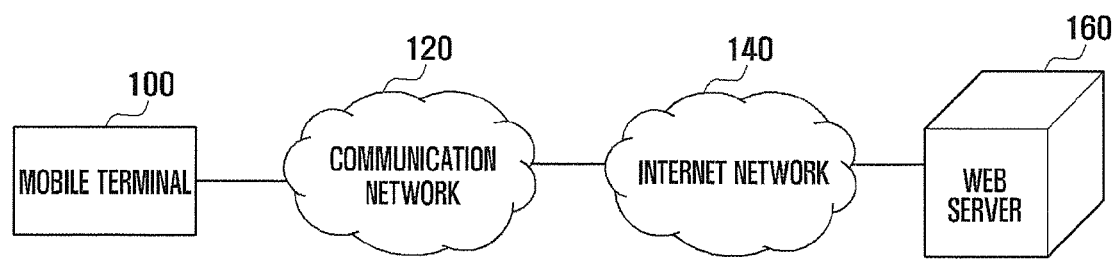
FIG. 1 illustrates a communication system used in an embodiment of the present invention.

FIG. 1 is a view schematically illustrating a communication system used in an embodiment of the present invention.

Referring to FIG. 1, the communication system includes a mobile terminal 100 equipped with a web browser, a communication network 120, internet network 140, and a web server 160.

The mobile terminal 100 of the present invention may be any information and communication appliance or multimedia appliance, such as a mobile phone, a wired/wireless phone, a personal digital assistant (PDA), a smart phone, a digital multimedia broadcasting (DMB) terminal, a laptop or personal computer, a global system for mobile communication (GSM)/general packet radio system (GPRS) terminal, and a 3G terminal such as an international mobile telecommunications 2000 (IMT 2000) terminal using wideband code division multiple access (WCDMA) technology, and a universal mobile telecommunication service (UMTS) terminal. The mobile terminal 100 is connected to the communication network via a wireless connection and accesses the internet network 140 through the communication network 120.

The communication network 120 is connected to the mobile terminal 100 and the internet network 140 via a wireless connection. The communication network 120 enables data to be transmitted and downloaded between the mobile terminal 100 and the Internet network 140 (i.e. the web server 160). The communication network 120 may be a network of a mobile communication company which charges a user for usage of the network or a wireless fidelity (Wi-Fi) network where additional usage of the network is charged; hereinafter referred to as a charging network.

The Internet network 140 refers to a network that complies with a communication protocol such as transmission control protocol/internet protocol (TCP/IP). The mobile terminal 100 may exchange and search for information through the internet network 140.

The web server 160 is connected to the internet network 140. Thus, the mobile terminal 100 may transmit and download information to and from the web server 160 via the internet network 140 using a web address.

Figure 2:
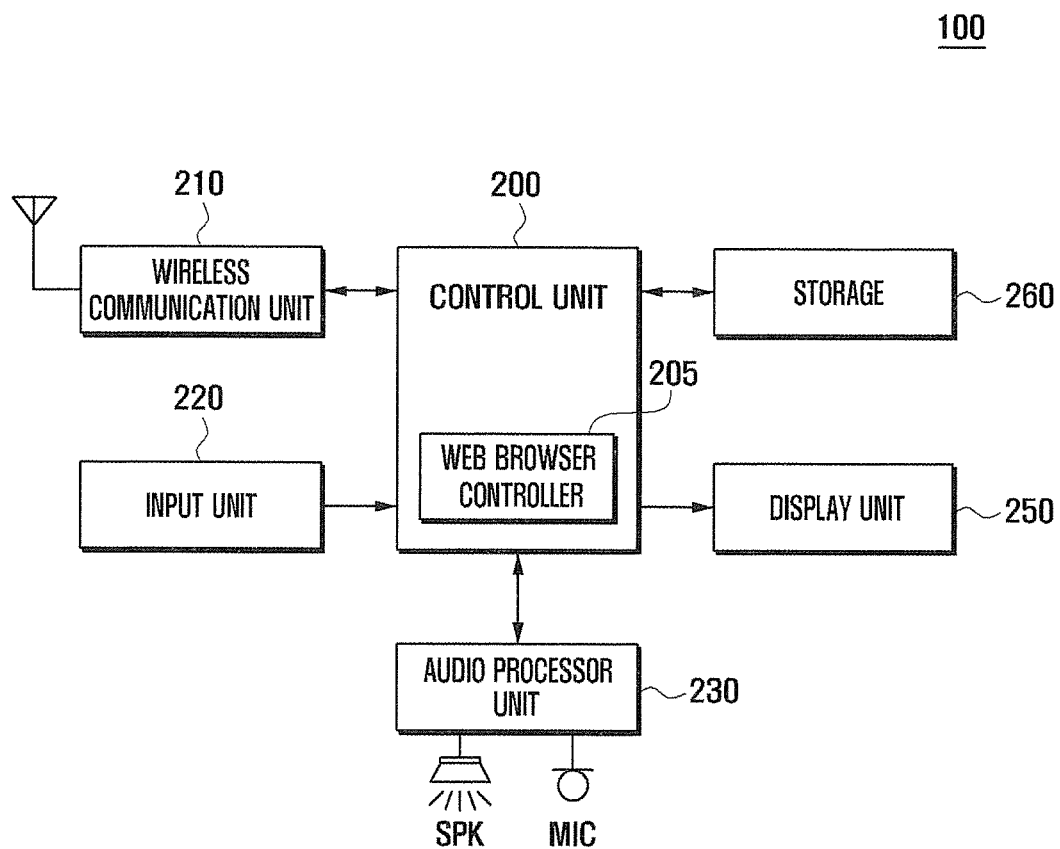
FIG. 2 illustrates a mobile terminal according to an embodiment of the present invention.

FIG. 2 is a block diagram schematically illustrating a mobile terminal according to an embodiment of the present invention.

Referring to FIG. 2, the mobile terminal 100 includes a wireless communication unit 210, an input unit 220, an audio processor 230, a display unit 250, a storage 260, and a control unit 200.

The wireless communication unit 210 performs a wireless communication function of the mobile terminal 100. The wireless communication unit 210 may include an RF transmitter that performs up-conversion and amplifies a frequency of a signal to be transmitted, and an RF receiver that performs low noise amplification of a received signal and down-conversion of a frequency of the received signal.

The wireless communication unit 210 accesses the web server 160 and transmits and downloads information to and from the web server 160. In other words, the wireless communication unit 210 may transmit a signal to request access to the web server 160 through the communication network 120 and the internet network 140 and may receive an access approval signal from the web server 160. The wireless communication unit 210, when accessing the communication network 120, transmits a web address, accesses the web server 160 based on the web address, and downloads an HTML file of the web page from the web server 160. Next, the wireless communication unit 210 makes a request for and downloads the web content of the web page under the control of the control unit 200.

The input unit 220 receives numeric and character information and other information for setting various functions, and performs a function of transmitting the input information to the control unit 200. The input unit 220 may include numeric keys, character keys, arrow keys for performing specific functions, function keys such as side keys and short keys, and a touch pad.

The audio processor 230 converts an audio signal output from a received audio CODEC into sound through a speaker SPK and transmits a transmitting audio signal generated from a microphone MIC to the audio CODEC.

The display unit 250 displays a state of the mobile terminal 100, especially the web page.

The storage 260 includes a program memory and data memories. The program memory stores operating programs of the mobile terminal 100, a program that controls data usage of the mobile terminal 100 according to an embodiment of the present invention, and a web browser. The data memories store data used and/or generated during the performance of the programs and the web browser.

The storage 260 stores information received from the web server 160 such as an HTML file of the web page and/or the web content under the control of the control unit 200. The storage 260 stores the amount of received information for a preset period (i.e., the data usage of the web browser) under the control of the control unit 200. Under the control of the control unit 200, the data usage of the web browser may be initialized periodically every preset period. The storage 260 stores a data usage limit and web content selecting criteria that can be set by a user.

The control unit 200 controls overall operation of the mobile terminal 100. The control unit 200 includes a data processor having a transmitter that encodes and modulates a signal to be transmitted and a receiver that decodes and demodulates a received signal. The data processor may include a MODEM and a CODEC.

The control unit 200 includes a web browser controller 205. The web browser controller 205 may determine the amount of data downloaded from the web server 160 and may add the determined data amount to the data usage of the web browser stored in the storage 260. The web browser controller 205 may initialize the data usage of the web browser every preset period. The web browser controller 205 may access the storage 260 and check the data usage of the web browser and the data usage limit for the comparison.

The web browser controller 205 may check web content of the web page using the web browser and may selectively receive the checked web content based on user setting. In more detail, the web browser controller 205 determines whether each of the checked web contents conform to a web content selecting criterion. When the web content conforms to the web content selecting criterion, the web browser controller 205 makes a request for the web content and downloads the web content from the web server 160. Alternatively, when the web content does not conform to the web content selecting criterion, the web browser controller 205 does not download the web content from the web server 160.

After determining whether to download the web content of the web page, the web browser controller 205 may control the display unit 250 to display the web page according to size (resolution) of the display unit 250 using the web browser. The web browser controller 205 displays the web content downloaded from the web server 160 through the wireless communication unit 210 on the display unit 250. In this embodiment, the web browser controller 205 may control the display unit 250 to display an outline of a region of web content that is contained in the web page but not downloaded.

As such, the web content of the web page is selectively downloaded, and the mobile terminal 100 may control the data usage downloaded from the web server 160 with the web browser.

The mobile terminal 100 may further include a Wi-Fi module (not shown). The Wi-Fi module accesses the Internet network 140 through the Wi-Fi network and performs a wireless communication function of transmitting and receiving information to and from the web server 160.

Figure 3:
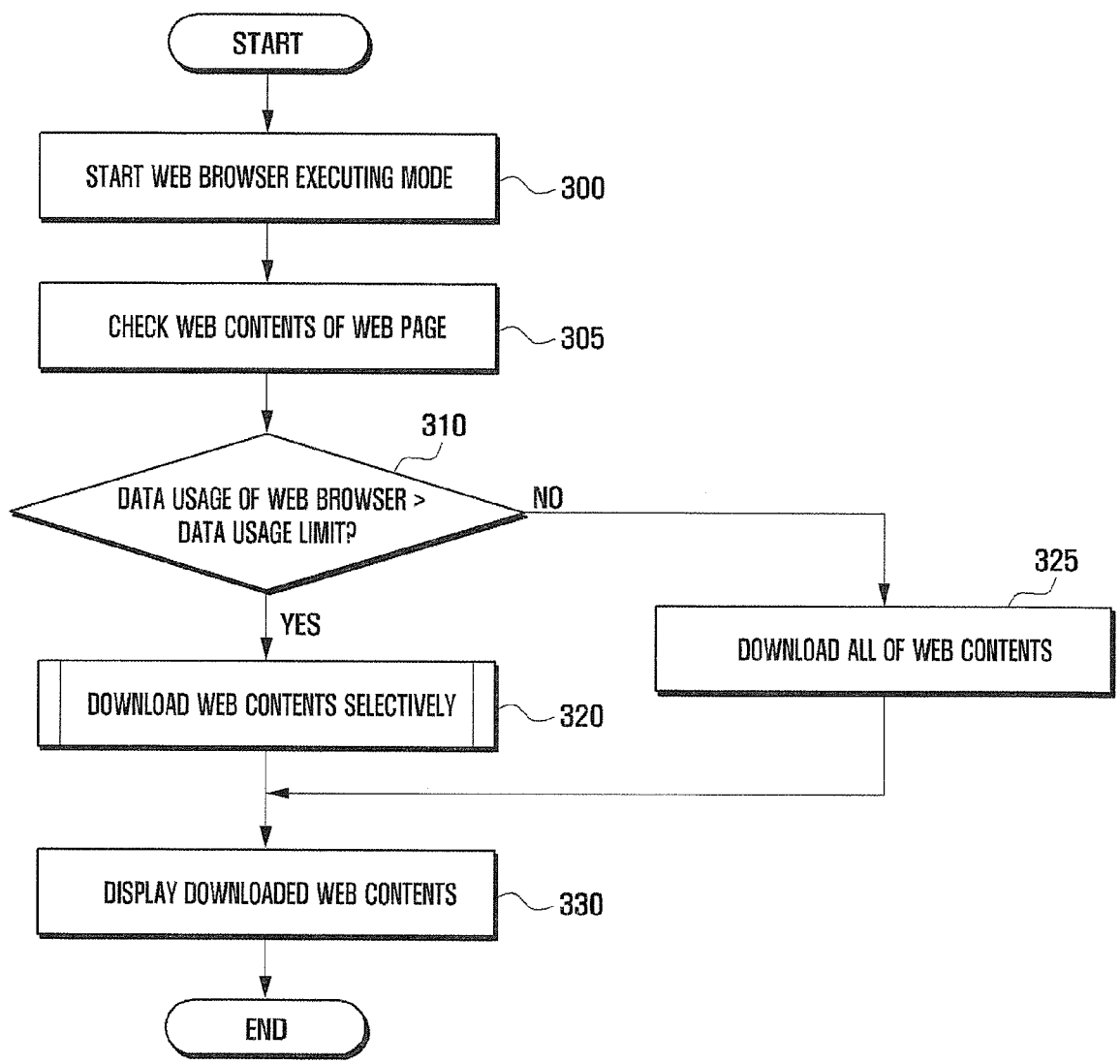
FIG. 3 illustrates a method of controlling data usage of a mobile terminal according to an embodiment of the present invention.

FIG. 3 is a flowchart schematically illustrating a method of controlling data usage of a mobile terminal according to an embodiment of the present invention.

Referring to FIG. 3, the method of controlling data usage is started when the web browser controller 205 starts a web browser executing mode (block 300). The web browser controller 205 makes a request for the HTML file of the web page to the web server 160 using the web browser and controls the web browser to download the requested HTML file from the web server 160. The HTML file may include an identifier of the web content. After the reception of the HTML file, the web browser controller 205 controls the web browser to check the web content of the web page (block 305). In order to check the web content, the web browser controller 205 controls the web browser to analyze the HTML file using the web browser and to check the web content using the identifier of the web content. The identifier of the web content may be one of the listed identifiers in the following Table 1. The identifiers of the web content in Table 1 are just a few examples and the identifiers can be any identifiers that represent the web content or any identifiers related to the web content.

TABLE 1

| Web content | Web content identifier |
|---|---|
| Popup window | window.onload and popup |
| Flash | application/x-shockwave-flash |
| image | img src |

Then, the web browser controller 205 compares the data usage of the web browser stored in the storage 260 with the data usage limit and determines whether the data usage exceeds the data usage limit (block 310).

When the data usage of the web browser exceeds the preset data usage limit, the web browser controller 205 may selectively download the web content checked in block 320 according to the web content selecting criterion stored in the storage 260. As such, since a user may set the data usage limit, excessive reception of data from the web server 160 by the mobile terminal 100 can be restrained according to user preferences. A user may set the mobile terminal 100 to download only relatively small amount of web content such as text and/or simple images.

Figure 4:
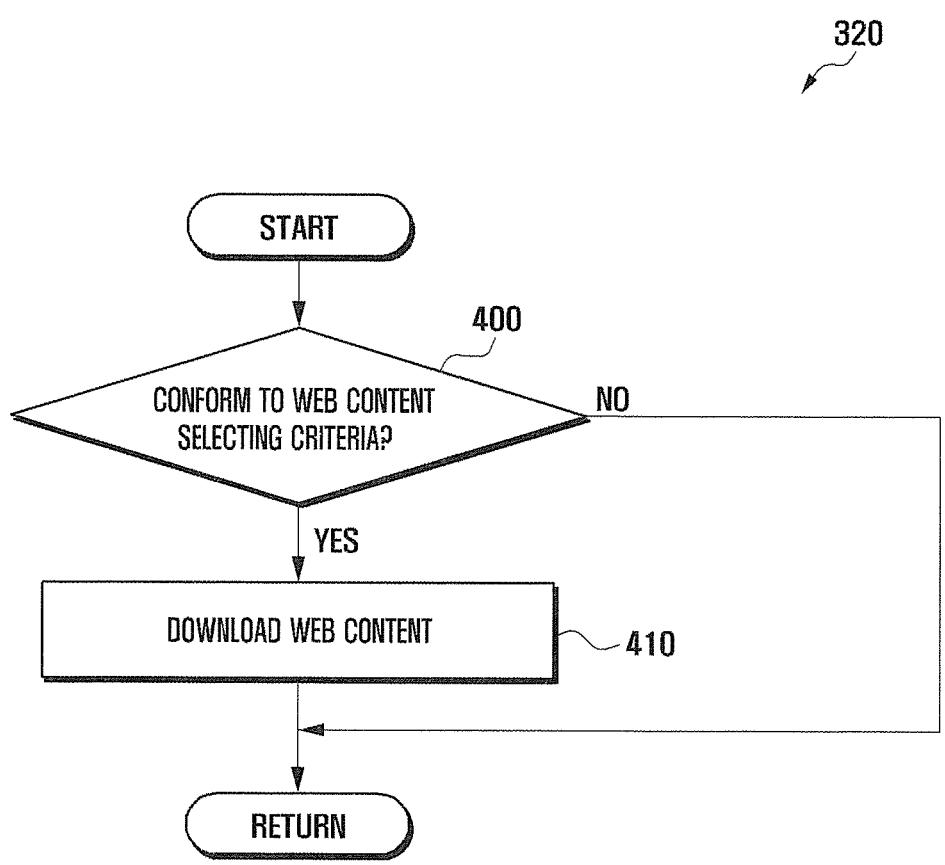
FIG. 4 illustrates a procedure of selectively receiving web content in FIG. 3.

With reference to FIG. 4, block 320 will be described in detail.

Referring to FIG. 4, the web browser controller 205 determines whether each of the web contents conform to the web content selecting criteria set by the user (block 400). The web content selecting criteria may include different types and sizes of the web content. For example, the web content selecting criteria may include selecting a popup window, flash content, and web content different from web content such as an image of specific size, for example, more than 50 Kb. Thus, a user may set the mobile terminal 100 not to download web content of relatively large data size.

When the web content is determined as being conformed to the web content selecting criteria, the web browser controller 205 makes a request for the web content conforming to the web content selecting criteria to the web server 160 and downloads the web content conforming to the web content selecting criteria from the web server 160 (block 410), and returns to block 330.

When the web content does not conform to the web content selecting criteria (block 400), the web browser controller 205 instructs the web browser to not download the web content that does not conform to the web content selecting criteria. The web browser controller 205 may control the web browser according to types of the web content in a different manner as described below. Then, the web browser controller 205 returns to block 330.

For example, it is assumed that the web content selecting criteria includes selecting web content different from web content such as a popup window, flash content, and an image of a specific size, that is, larger than 50 Kb. When the checked web content is a popup window (305), the web browser controller 205 determines that the checked web content does not conform to the web content selecting criteria. Then, the web browser controller 205 does not process HTML tags of the HTML file containing identifiers of the popup window as listed in Table 1.

When the checked web content is Adobe® Flash® content (hereinafter, referred to as 'flash content'), the web browser controller 205 determines that the checked web content does not conform to the web content selecting criterion. Then, the web browser controller 205 does not transmit a signal to make a request for the flash content to the web server 160, and returns to block 330.

When the checked web content is an image, the web browser controller 205 checks the size of the image. The web browser controller 205 controls the web browser to transmit a signal to make a request for web content, that is, the image to the web server 160. When the web browser receives information on the requested image from the web server 160, the web browser controller 205 checks the size of the image using the web browser. In order to check the size of the image, the web browser controller 205 may use a field value of 'content-length' from the information received.

When the size of the checked image is larger than 50 KB, the web browser controller 205 determines that the web content does not conform to the web content selecting criteria. The web browser controller 205 controls the web browser to set a 'reset flag' of TCP and to transmit the 'reset flag' to the web server 160. The web server 260 that receives the 'reset flag' does not transmit the image. Then, the web browser controller 205 returns to block 330.

Alternatively, when the size of the image is smaller than 50 KB, the web browser controller 205 determines that the checked web content conforms to the web content selecting criteria. Then, the web content browser controller 205 controls the web browser to download the web content from the web server 160 (block 410).

Thus, when the data usage of the web browser exceeds the data usage limit, the web content checked based on the web content selecting criteria is downloaded so that the mobile terminal 100 may automatically control the data usage.

When the data usage of the web browser does not exceed the data usage limit (block 310), the web browser controller 205 downloads all of the checked web content of the web page (block 325). A method of downloading web content by a web browser is widely known to those skilled in the art and the description will be omitted.

Finally, the web browser controller 205 controls the web browser to process the downloaded web content according to the size (resolution) of the display unit 250 and to display the web content on the display 250 (block 330). According to an embodiment of the present invention, the web browser controller 205 may control the web browser to display an outline of a region of the web content that is contained in the web page but not downloaded. The fact that the web content is not downloaded may be displayed in the region with text. In addition, when the region is selected, the web browser controller 205 may control the web browser to download web content corresponding to the selected region from the web server 160.

Thus, when a user sets the data usage limit and the web content selecting criteria, the mobile terminal 100 may display only web content a user wants when the data usage of the mobile terminal 100 exceeds the data usage limit. Therefore, the data usage limit and the web content selecting criteria, employed in embodiments of the present invention, may be set to display only a web page that contains text or simple images as according to user preferences. Moreover, the data usage of the web browser is automatically controlled using the data usage limit and the web content selecting criteria.

The web browser controller 205 may access the storage 260 to update the data usage of the web browser after downloading the web content selectively or entirely. Alternatively, the web browser controller 205 may add the amount of the downloaded web content to the data usage of the web browser after downloading of the web content.

As described above, the web browser controller 205 compares the data usage of the web browser with the data usage limit before downloading the web content, but the present invention is not limited thereto. The web browser controller 205 may compare the data usage of the web browser with the data usage limit at every download of web content.

In the above embodiment, the web browser controller 205 selectively downloads web content according to whether the data usage of the web browser exceeds the data usage limit, but the present invention is not limited thereto.

That is, the web browser 205 may selectively download web content according to a type of the communication network 120 which the mobile terminal 100 accesses. The mobile terminal 100 may control all of web content based on the type of the communication network 120 and the data usage of the web browser. For example, when the communication network 120 connected to the mobile terminal 100 is a network of a mobile communication company (that is, a charging network), the web browser controller 205 may check the data usage of the web browser. Alternatively, when the communication network 120 connected to the mobile terminal 100 is the charging network, the web browser controller 205 may control the web browser to download the web content selectively. Thus, the data usage may be controlled such that the mobile terminal 100 downloads web content without excessive data usage according to a registered data plan with a mobile communication company. Alternatively, when the communication network 120 connected to the mobile terminal 100 is a Wi-Fi network that can be used without an additional charge, the web browser controller 205 may control the web browser to download all web contents.

The web browser controller 205 may control the web browser to download web content according to a data transfer rate of the communication network 120 in the same manner as described above. For example, when the data transfer rate of the communication network 120 is slower than a preset data transfer rate, the web browser may download relatively small web content such as text and simple images set by a user. Thus, the mobile terminal 100 may improve web page display speed according to the data transfer rate of the communication network 120.

Although the present disclosure has been described with exemplary embodiments, various changes and modifications may be suggested to one skilled in the art. It is intended that the present disclosure encompass such changes and modifications as fall within the scope of the appended claims.

What is claimed is:

1. A method of controlling data usage in a mobile terminal, the method comprising:
    receiving, by the mobile terminal, web page information loaded by a web browser from a web server according to a web browser execution request;
    checking, by the mobile terminal, a plurality of web contents constituting a web page based on the web page information;
    determining, by the mobile terminal, web contents to be downloaded among the checked web contents according to a user setting;
    transmitting, by the mobile terminal, a request for downloading web contents corresponding to the user setting based on the result of the determination to the web browser;
    downloading, by the mobile terminal, the requested web contents from the web server; and
    displaying, by the mobile terminal, the downloaded web contents.

2. The method of claim 1, wherein the determining comprises:
    determining whether each of the checked web contents conforms to a web content selecting criterion.

3. The method of claim 2, wherein the web content selecting criterion comprises at least one of a type and a size of the web content.

4. The method of claim 3, wherein the type of the web content comprises at least one of a popup window, a flash, an image, and text.

5. The method of claim 2, further comprising:
    determining whether a communication network through which the mobile terminal accesses a web server storing the web page corresponds to a predetermined communication network;
    wherein the checking the plurality of the web contents comprises checking the plurality of the web contents contained in the web page when the communication network corresponds to the predetermined communication network.

6. The method of claim 1, further comprising:
downloading and displaying, when the region is selected, web content corresponding to the selected region.

7. A mobile terminal comprising:
a storage configured to store a web browser, data usage of the web browser for a preset period, and a data usage limit;
a web browser controller configured to:
receive web page information loaded by the web browser from a web server according to a web browser execution request;
check a plurality of web contents constituting a web page based on the web page information;
determine web contents to be downloaded among the checked web contents according to a user setting;
transmit a request for downloading web contents corresponding to the user setting based on the result of the determination to the web server; and
download the requested web contents from the web server; and
a display unit configured to display the downloaded web contents.

8. The mobile terminal of claim 7, wherein the display unit is further configured to display text in the region of the web page associated with the checked web content that does not conform to a web content selecting criterion, the text indicating that the web content is not downloaded.

9. The mobile terminal of claim 8, wherein the web content selecting criterion comprises at least one of a type and a size of the web content.

10. The mobile terminal of claim 9, wherein the type of the web content comprises at least one of a popup window, a flash, an image, and text.

11. The mobile terminal of claim 8, wherein the web browser controller determines whether a communication network through which the mobile terminal accesses a web server storing the web page corresponds to a predetermined communication network, and checks the plurality of the web contents contained in the web page when the communication network corresponds to the predetermined communication network.

12. The mobile terminal of claim 7, wherein the web browser controller controls the web browser to download and display, when the region is selected, web content corresponding to the selected region.

13. The method of claim 2, wherein the downloading comprises:
selectively downloading at least one web content that conforms to the web content selecting criterion and not downloading the at least one web content that does not conform to the web content selecting criterion.

14. The method of claim 1, wherein the determining comprises:
determining web contents to be downloaded when data usage for a preset period exceeds a data usage limit.

15. The method of claim 1, wherein the displaying comprises:
displaying an outline of a region of the web page associated with the at least one web content that is not downloaded.

16. The method of claim 1, further comprising displaying text in the region of the web page associated with the checked web content that does not conform to the web content selecting criterion, the text indicating that the web content is not downloaded.

17. The mobile terminal of claim 8, wherein the web browser controller is configured to selectively download the each web content that conforms to the web content selecting criterion and not download the each web content that does not conform to the web content selecting criterion.

18. The mobile terminal of claim 7, wherein the web browser controller is configured to determine web contents to be downloaded when data usage for a preset period exceeds a data usage limit.

19. The mobile terminal of claim 7, wherein the display unit is configured to display an outline of a region of the web page associated with each web content that is not downloaded.

20. An apparatus for use in a mobile terminal, the apparatus comprising:
a storage configured to store a web browser; and
a controller configured to:
receive web page information loaded by the web browser from a web server according to a web browser execution request;
check a plurality of web contents constituting a web page based on the web page information;
determine web contents to be downloaded among the checked web contents according to a user setting;
transmit a request for downloading web contents corresponding to the user setting based on the result of the determination to the web server;
download the requested web contents from the web server; and
control a display unit to display the downloaded web contents.

21. The method of claim 1, wherein receiving the web page information comprises receiving a HTML file comprising an identifier of at least one of the web contents, and
wherein checking the web contents comprises analyzing the identifier of the at least one web content and identifying a type of the at least one web content based on the identifier.

* * * * *